United States Patent
Uratani et al.

(10) Patent No.: US 6,563,602 B1
(45) Date of Patent: May 13, 2003

(54) IMAGE PROCESSING APPARATUS AND METHOD, AND RECORDING MEDIUM

(75) Inventors: Mitsuru Uratani, Kawasaki (JP); Shigeki Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/385,431

(22) Filed: Aug. 30, 1999

(30) Foreign Application Priority Data

Aug. 31, 1998 (JP) .......................................... 10-245099
Aug. 19, 1999 (JP) .......................................... 11-232990

(51) Int. Cl.$^7$ .............................................. G06K 15/00
(52) U.S. Cl. ........................................ 358/1.9; 382/162
(58) Field of Search ........................ 358/1.9, 504, 518; 382/162, 167

(56) References Cited

U.S. PATENT DOCUMENTS 4,679,074 A * 7/1987 Sugiura et al. ................ 358/80
5,717,839 A * 2/1998 Ichikawa ..................... 395/109

* cited by examiner

Primary Examiner—Jerome Grant, II
(74) Attorney, Agent, or Firm—Fitzpatrick, Cella, Harper & Scinto

(57) ABSTRACT

In conventional white balance adjustment, the processing is switched at the boundary of a threshold. When white balance adjustment is done for two regions having values near the threshold and similar color tones, their impressions become greatly different from each other. To prevent this, this invention calculates a white balance adjustment coefficient for each color component forming color image data, corrects the adjustment coefficient so as to be consecutive for each value of the color image data, and performs white balance adjustment based on the corrected adjustment coefficient. In performing a plurality of types of correction processes for image data, it is difficult to execute an optimal combination of correction processes in accordance with an input device. This invention specifies the characteristics of the input device, and controls a combination of correction processes with respect to the image data on the basis of the characteristics, thereby realizing proper correction based on the input device characteristics.

17 Claims, 18 Drawing Sheets

FIG. 4

| ITEM | VALUE |
|---|---|
| REPRESENTATIVE VALUE OF R CHANNEL | # # # |
| REPRESENTATIVE VALUE OF G CHANNEL | # # # |
| REPRESENTATIVE VALUE OF B CHANNEL | # # # |
| ADJUSTMENT COEFFICIENT OF R CHANNEL | # # # |
| ADJUSTMENT COEFFICIENT OF G CHANNEL | # # # |
| ADJUSTMENT COEFFICIENT OF B CHANNEL | # # # |

FIG. 14

IMAGE INFORMATION
      INPUT DEVICE NAME
      INPUT DEVICE SETTING INFORMATION
      IMAGE SIZE
          ·
          ·
          ·

IMAGE DATA
          ·
          ·
          ·

FIG. 17

|  | CONTRAST CORRECTION DEGREE (%) | LIGHTNESS CORRECTION DEGREE (%) | COLOR BALANCE CORRECTION DEGREE (%) | SATURATION CORRECTION DEGREE (%) | SHARPNESS CORRECTION DEGREE (%) |
|---|---|---|---|---|---|
| INPUT DEVICE A | 1st 20 | 2nd 20 | 3rd 15 | 4th 10 | 5th 15 |
| INPUT DEVICE B | FALSE — | 2nd 10 | 1st 5 | 3rd 10 | 4th 5 |
| INPUT DEVICE C | 1st 15 | 2nd 10 | FALSE — | 4th 5 | 3rd 10 |
| INPUT DEVICE D | FALSE — | FALSE — | FALSE — | 1st 15 | 2nd 5 |
| ⋮ | ⋮ | ⋮ | ⋮ | ⋮ | ⋮ |

IMAGE PROCESSING APPARATUS AND METHOD, AND RECORDING MEDIUM

BACKGROUND OF THE INVENTION

1. Field of the Invention

This invention relates to an image processing apparatus and method for correcting the image quality of an original image, and a recording medium.

2. Description of the Related Art

In general, image processing apparatuses execute white balance adjustment for correcting the brightness of an input image. In white balance adjustment, the adjustment degree and proper processing change depending on an image scene. When the conventional image processing apparatus is to perform white balance adjustment, it sets in advance a predetermined threshold for determining the image scene, compares a representative value representing the feature of image data to be adjusted with the threshold, and switches the white balance adjustment method with respect to the image data in accordance with the comparison result.

However, since the conventional white balance adjustment is done to mainly adjust the image brightness, white balance adjustment for a color image may result in unnatural color balance.

Further, since the conventional white balance adjustment processing is switched at the boundary of the threshold, white balance adjustment changes for image data having a value near the threshold as a representative value depending on whether the representative value is larger or smaller than the threshold value. For example, even when two image data have almost the same representative value and similar color tones, if their representative values are larger and smaller than the threshold, respectively, the two image data give greatly different impressions upon white balance adjustment processing.

An image processing apparatus, which has an interface with an external device and allows image input via the interface, can be connected to a plurality of types of image input devices.

If this apparatus is equipped with, e.g., three adjustment means for "contrast adjustment", "color balance adjustment", and "lightness adjustment", the apparatus adopts an image processing method of correcting an image input from each connected image input device using all the adjustment means, thereby achieving image quality adjustment corresponding to the characteristics of each input device.

In the conventional image processing apparatus, the order of correction processes by the respective adjustment means is determined in advance and cannot be changed. Depending on a connected input device, it may be preferable to change the processing order or not to execute specific processing. However, the conventional image processing apparatus cannot appropriately cope with such input device, so it is difficult to perform optimal correction in accordance with a plurality of connected input devices.

SUMMARY OF THE INVENTION

Accordingly, it is an object of the present invention to provide an image processing apparatus and method capable of performing proper white balance adjustment with good color balance, and a recording medium.

According to the present invention, the foregoing object is attained by providing an image processing apparatus comprising: input means for inputting color image data; representative value calculation means for calculating a representative value for each color component forming the color image data; adjustment coefficient calculation means for calculating an adjustment coefficient based on the representative value for correcting the color image data; and image correction means for performing correction based on the adjustment coefficient for each color component of the color image data.

Thus, the white balance adjustment coefficient can be determined in accordance with the representative value of each color component representing image features.

And it is another object of the present invention to provide an image processing apparatus and method for performing proper white balance adjustment with good color balance without greatly changing adjustment results between similar images, and a recording medium.

According to the present invention, the foregoing object is attained by further providing: adjustment coefficient correction means for correcting the adjustment coefficient calculated by said adjustment coefficient calculation means wherein said adjustment coefficient correction means corrects the adjustment coefficient so as to be consecutive with respect to each value of the color image data.

The white balance adjustment coefficient can be continuously corrected in accordance with image features.

And it is another object of the present invention to provide an image processing apparatus and method for performing proper white balance adjustment in accordance with an input device, and a recording medium.

According to the present invention, the foregoing object is attained by providing an image processing apparatus comprising: wherein the input means inputs the color image data via an input device, and the adjustment coefficient correction means corrects the adjustment coefficient in accordance with a characteristic of the input device.

Proper white balance adjustment based on input device characteristics can be realized.

And it is another object of the present invention to provide an image processing apparatus and method capable of performing optimal correction in accordance with an input device when a plurality of types of correction processes are done for image data, and a recording medium.

According to the present invention, the foregoing object is attained by providing an image processing apparatus comprising: an image processing apparatus capable of performing correction processing by a plurality of types of correction methods for image data, comprising: image input means for inputting image data from an input device; specifying means for specifying characteristics of the input device; and correction control means for controlling a plurality of types of correction processes for the image data on the basis of the characteristics of the input device.

A plurality of correction processes for image data can be controlled based on input device characteristics to realize optimal correction.

The invention is particularly advantageous since the white balance adjustment coefficient can be determined for each color in accordance with image features to realize proper white balance adjustment with good balance.

The white balance adjustment coefficient can be continuously corrected in accordance with image features to realize proper white balance adjustment with good balance while preventing the adjustment results of similar images from becoming greatly different from each other.

Further, optimal image correction corresponding to input device characteristics can be realized.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing an example of data held in the parameter holding unit of the first embodiment;

FIG. 14 is a view showing an example of the format of an input image signal in the third embodiment;

FIG. 17 is a table showing an example of data held in the parameter holding unit of the fourth embodiment;

DETAILED DESCRIPTION OF THE PREFERRED EMBODIMENTS

Preferred embodiments of the present invention will now be described in detail in accordance with the accompanying drawings.

<First Embodiment>

Figure 1:
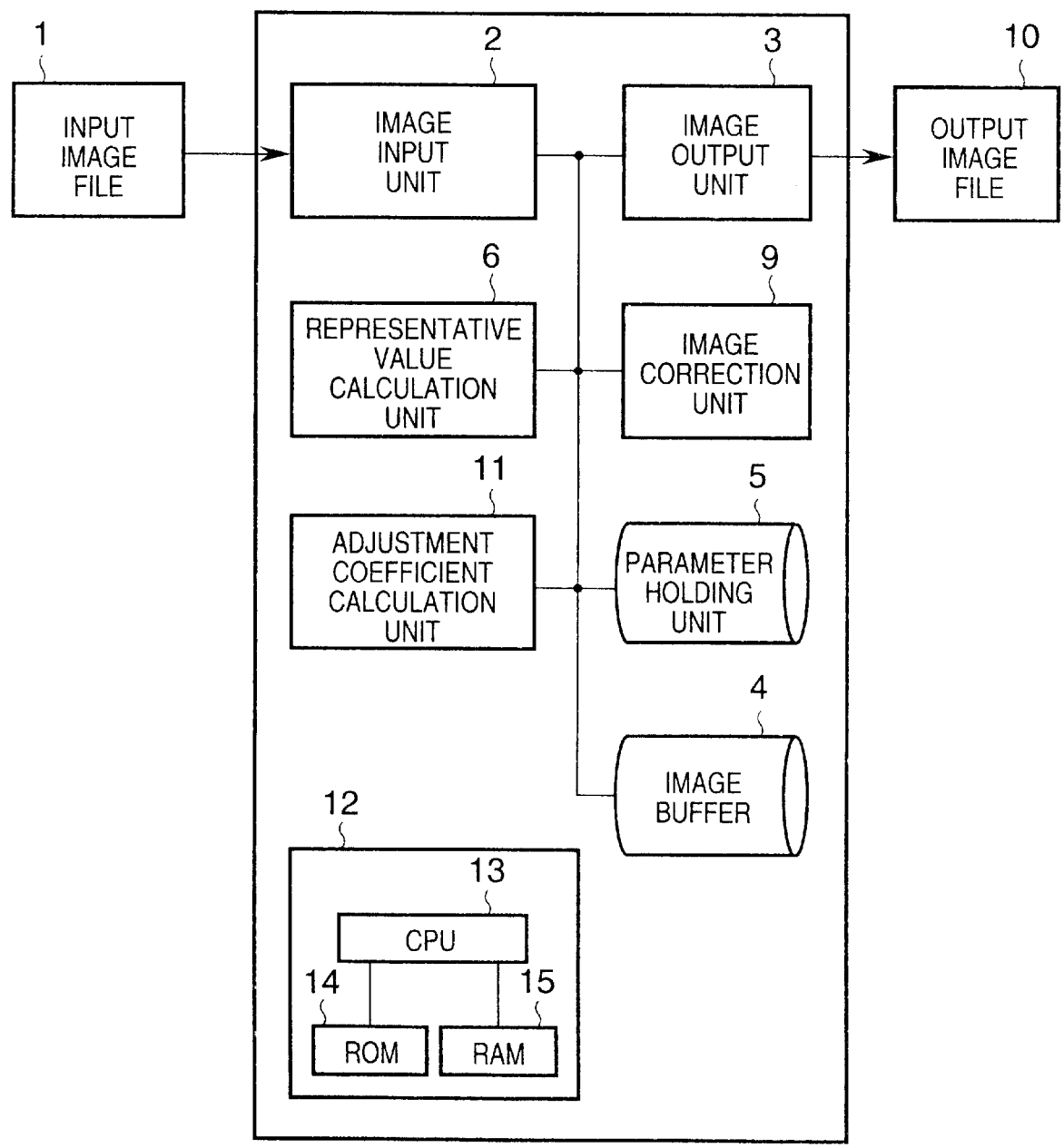
FIG. 1 is a block diagram showing an arrangement for performing white balance adjustment in an image processing apparatus according to the first embodiment of the present invention.

FIG. 1 is a block diagram showing an arrangement for performing white balance adjustment in an image processing apparatus according to the first embodiment. Referring to FIG. 1, the image processing apparatus comprises an image input unit 2, image output unit 3, image buffer 4, parameter holding unit 5, representative value calculation unit 6, adjustment coefficient calculation unit 11, and image correction unit 9.

The image input unit 2 reads image data from an input image file 1 and writes the data in the image buffer 4. Note that image data in the first embodiment is a color image made up of R (Red), G (Green), and B (Blue) color components (to be referred to as channels). The parameter holding unit 5 holds parameters necessary for image correction (to be described later). The representative value calculation unit 6 calculates representative values for the R, G, and B channels, and stores the representative values in the parameter holding unit 5. The adjustment coefficient calculation unit 11 calculates a middle value from the three, R, G, and B representative values, calculates adjustment coefficients for the channels using the middle value as a target, and stores the adjustment coefficients in the parameter holding unit 5. The image correction unit 9 corrects the image stored in the image buffer 4 on the basis of the adjustment coefficients stored in the parameter holding unit 5. The image output unit 3 writes the image data stored in the image buffer 4 in an output image file 10.

Reference numeral 12 denotes a controller for controlling the whole apparatus that comprises a CPU 13, ROM 14, and RAM 15. The CPU 13 reads out a control program stored in the ROM 14 to the RAM 15, and executes it, thereby realizing control unique to the first embodiment shown in the following flow chart.

Figure 2:
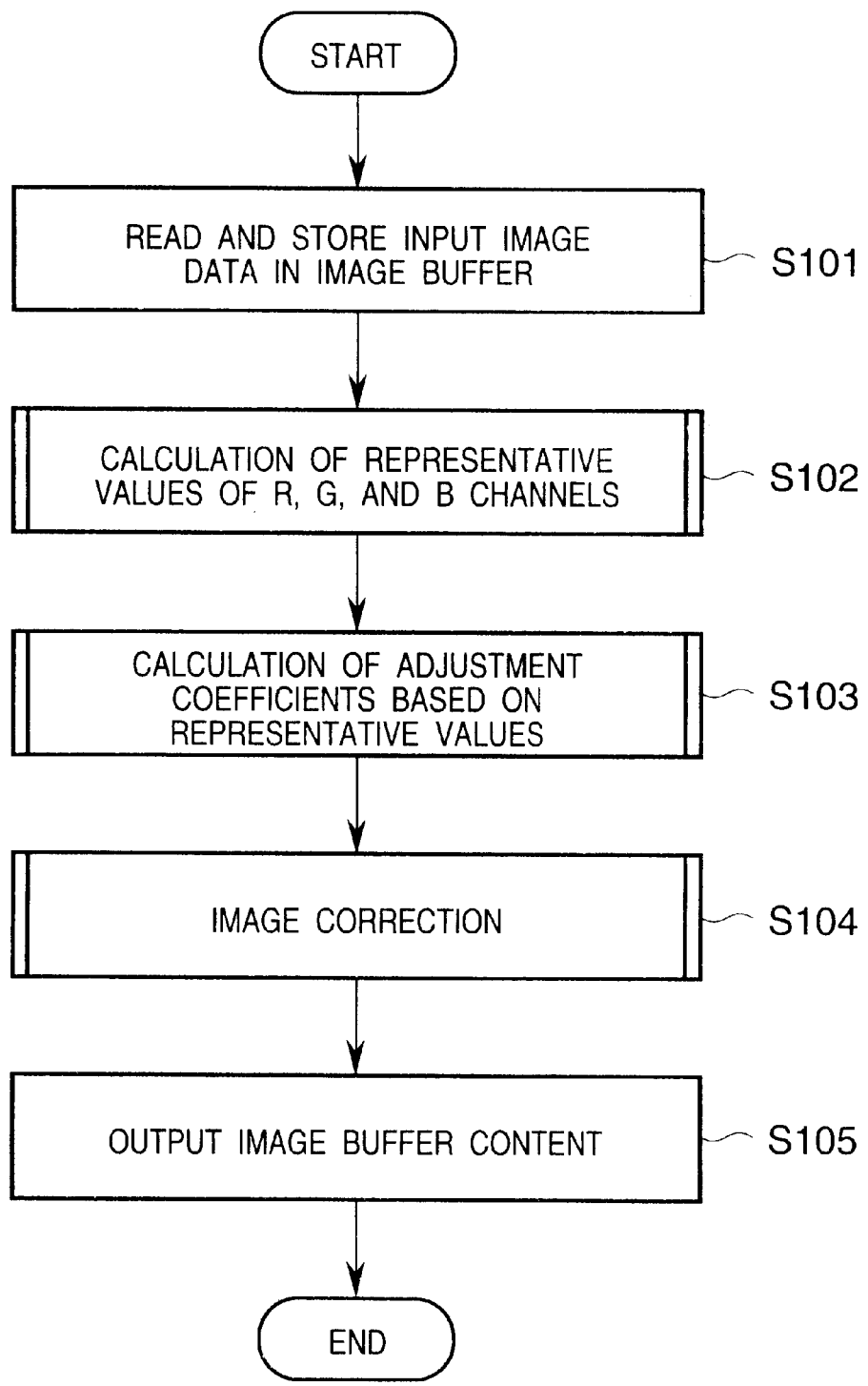
FIG. 2 is a flow chart showing white balance adjustment processing in the first embodiment.

FIG. 2 is a flow chart showing white balance adjustment processing in the arrangement shown in FIG. 1. The processing of the flow chart is realized when the CPU 13 executes a control program stored in the ROM 14.

In step S101, the image input unit 2 reads image data from the input image file 1, and stores it in the image buffer 4. Instep S102, the representative value calculation unit 6 calculates representative values for the R, G, and B channels of the image data stored in the image buffer 4. In step S103, the adjustment coefficient calculation unit 11 calculates adjustment coefficients for the R, G, and B channels on the basis of the representative values calculated in step S102. In step S104, the image correction unit 9 reads out the image data from the image buffer 4, corrects it, and writes the image data in the image buffer 4 again. Detailed operation of the image correction unit 9 will be described below. In step S105, the image output unit 3 writes the image data stored in the image buffer 4 in the output image file 10, thereby obtaining the image adjusted in white balance.

Figure 3:
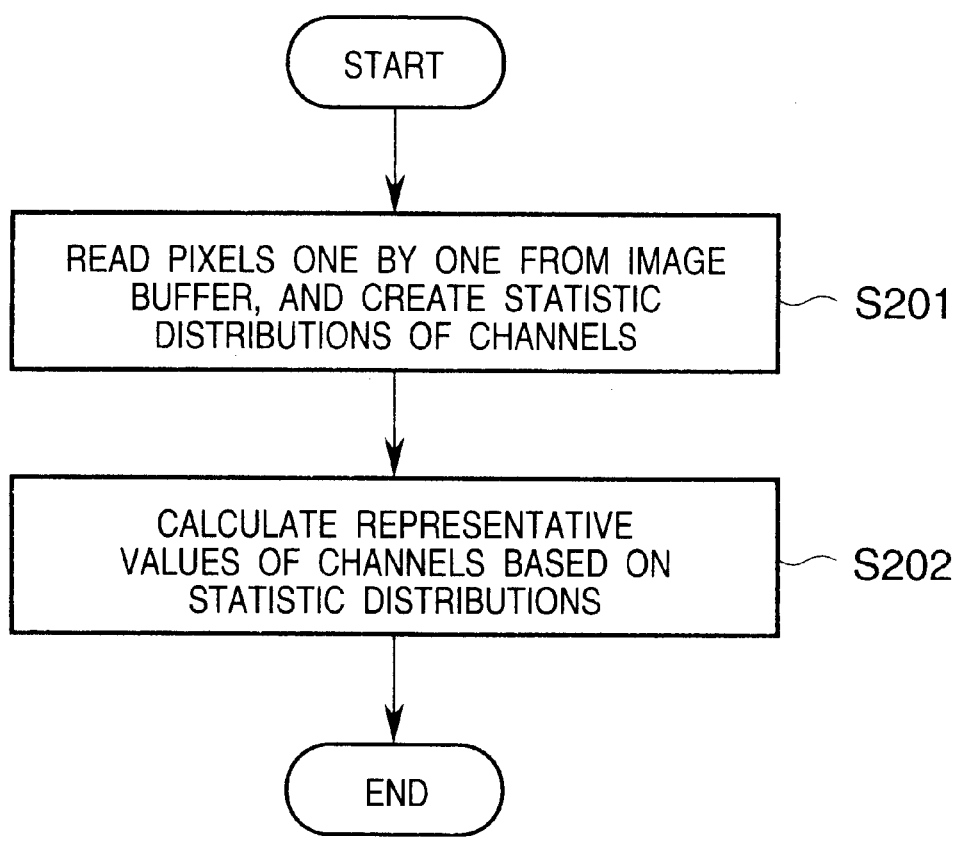
FIG. 3 is a flow chart showing representative value calculation processing in the first embodiment.

FIG. 3 is a flow chart showing detailed representative value calculation processing in step S102. This processing is executed by the representative value calculation unit 6.

In step S201, the representative value calculation unit 6 reads out pixels one by one from the image buffer 4, and creates statistical luminance distributions, i.e., histograms for the R, G, and B channels. In step S202, the representative value calculation unit 6 calculates the representative values of the R, G, and B channels based on the histograms. Each representative value represents the feature of image data for each color such as the average (mean), median, or the like for each color. The representative values are stored in the parameter holding unit 5.

FIG. 4 shows an example of data items held in the parameter holding unit 5. In an initial state, appropriate initial values are set as the adjustment coefficients of the colors.

Figure 5:
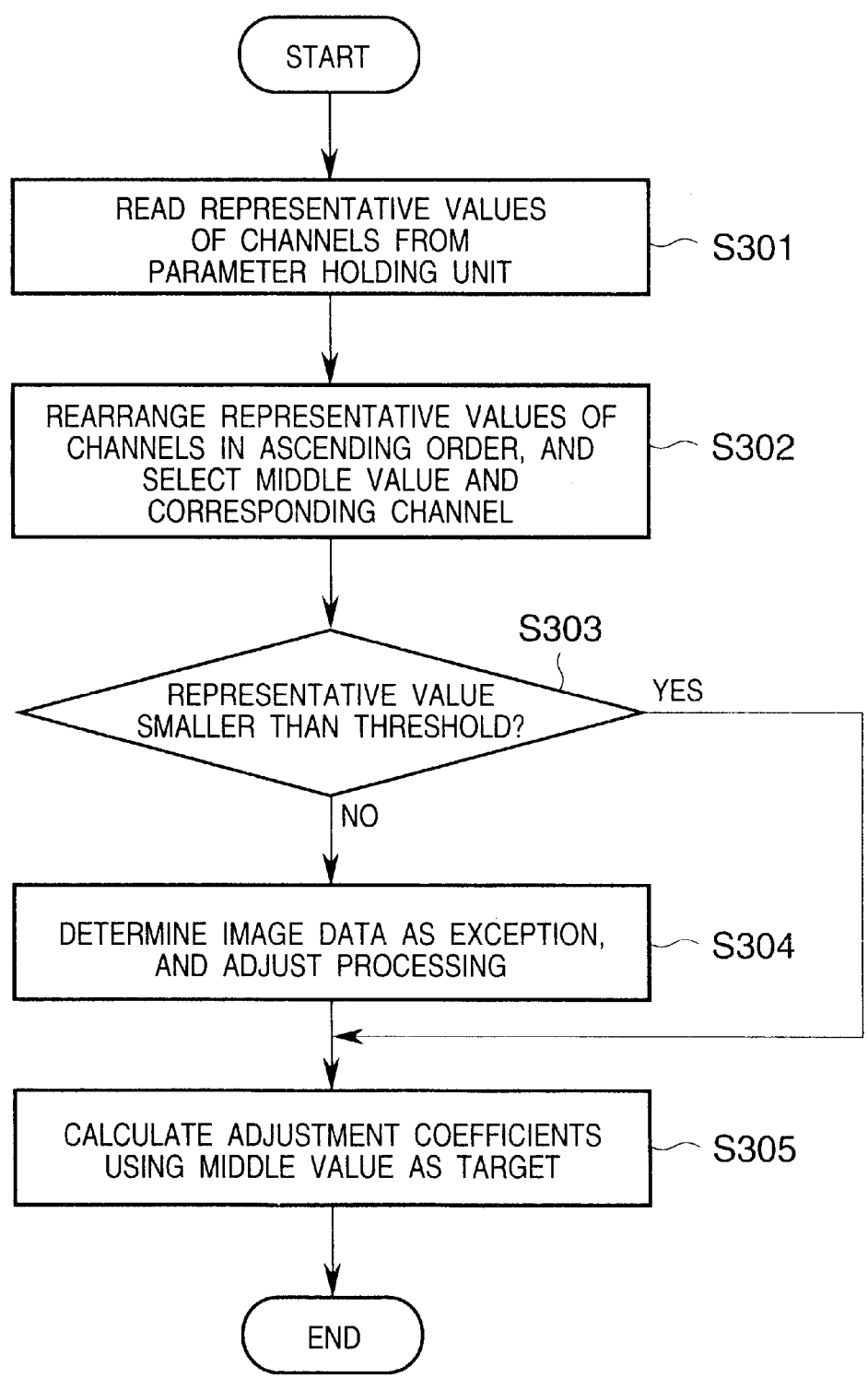
FIG. 5 is a flow chart showing adjustment coefficient calculation processing in the first embodiment.

FIG. 5 is a flow chart showing detailed adjustment coefficient calculation processing in step S103. This processing is executed by the adjustment coefficient calculation unit 11.

In step S301, the adjustment coefficient calculation unit 11 reads out the representative values of the channels from the parameter holding unit 5. In step S302, the adjustment coefficient calculation unit 11 rearranges the representative values in an ascending order, and selects a center channel and its middle value. For example, when average values are used as the representative values, and the channels have representative values: R=155, G=163, and B=143, the middle value as a target is "155" of the "R channel".

In step S303, the adjustment coefficient calculation unit 11 calculates the relationship between the middle value selected in step S302 and other representative values as, e.g., a ratio, and compares the calculation result (ratio) with a predetermined threshold, thereby determining whether the image data represents a special scene. If the image data is determined to represent no special scene, the flow shifts to step S305; otherwise, to step S304 to perform image processing corresponding to the determined scene.

In step S305, the adjustment coefficient calculation unit 11 calculates adjustment coefficients for the channels using the middle value as a target, and stores the calculated adjustment coefficients in the parameter holding unit 5. For example, when the adjustment coefficient is a γ value in 256-level gradation, the adjustment coefficient calculation unit 11 calculates γ using equation (1) and sets it as the adjustment coefficient:

$$\gamma = \{\log(\text{middle value}/255)\}/\{\log(\text{representative value}/255)\} \quad (1)$$

Figure 6:
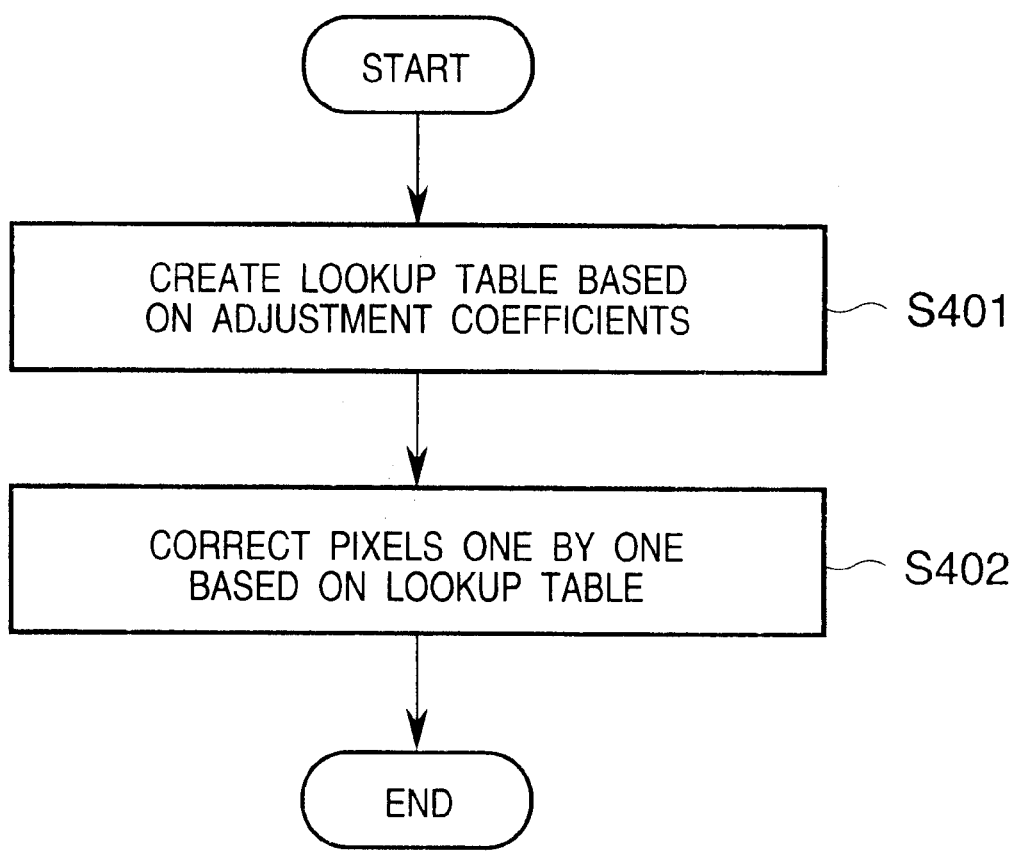
FIG. 6 is a flow chart showing image correction processing in the first embodiment.

FIG. 6 is a flow chart showing detailed image correction processing in step S104. This processing is executed by the image correction unit 9.

In step S401, the image correction unit 9 creates a lookup table based on the adjustment coefficients held in the parameter holding unit 5. In step S402, the image correction unit 9 corrects image data stored in the image buffer 4 one by one on the basis of the lookup table.

Figure 7:
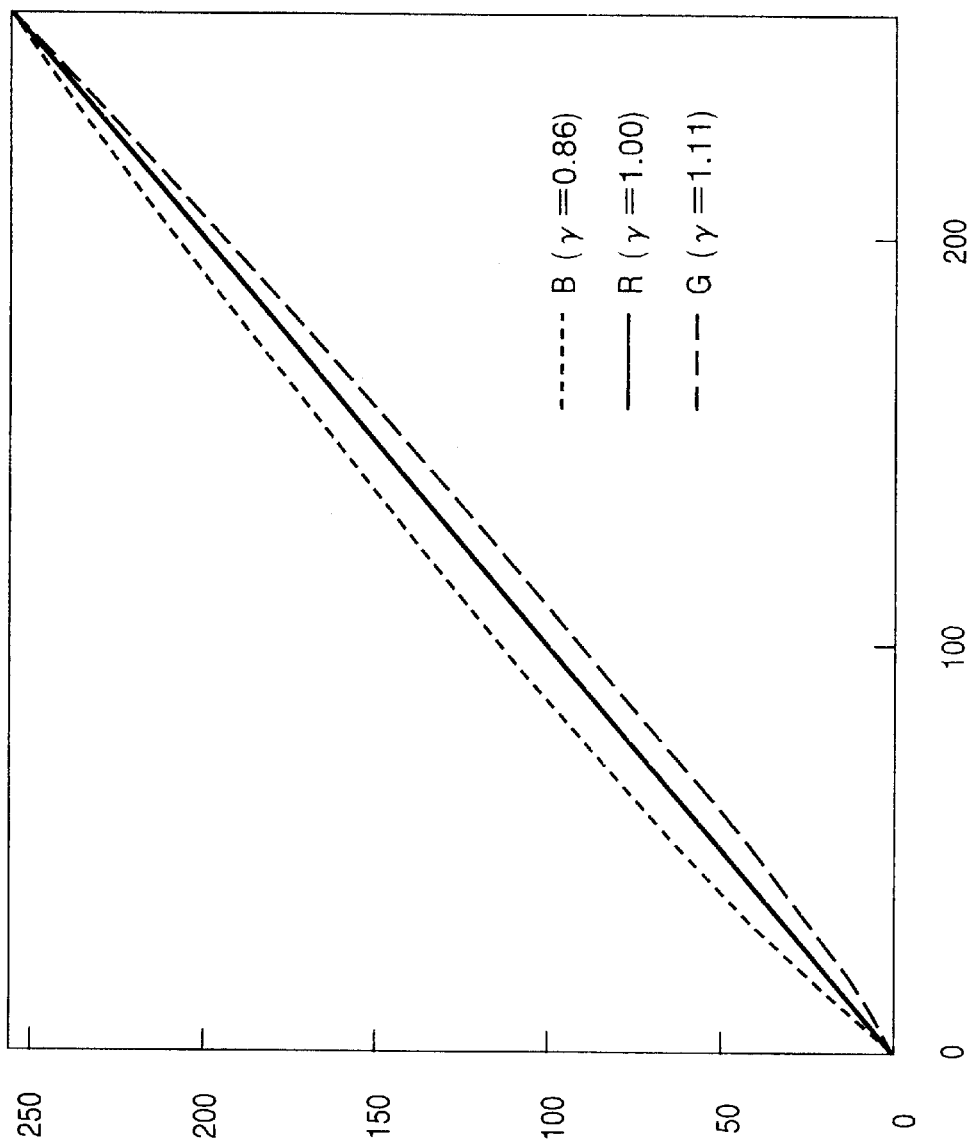
FIG. 7 is a graph showing an example of a lookup table which is looked up in image correction processing in the first embodiment.

FIG. 7 is a graph showing an example of the lookup table created in step S402. The image correction unit 9 creates the lookup table based on the calculated adjustment coefficients (γ values in the first embodiment) held in the parameter holding unit 5. In FIG. 7, the representative value of the B component is the smallest, and the representative value of the G component is the largest. Hence, the γ values of the B and G components are respectively strengthened and weakened toward the representative value of the R component serving as the middle value. By weakening the strongest G component and strengthening the weakest B component, the total white balance can be adjusted.

As described above, according to the first embodiment, the white balance adjustment coefficients are calculated for the respective color components on the basis of the ratio of the representative value of each color component to the middle value. The first embodiment can realize white balance adjustment with good color balance particularly in halftone expression.

<Second Embodiment>

White balance adjustment in the second embodiment of the present invention will be explained.

In white balance adjustment described in the first embodiment, as shown in step S303 of FIG. 5, the representative value is compared with a predetermined threshold to switch adjustment processing in accordance with the result. Depending on whether the representative value is larger or smaller than the threshold, adjusted image data having almost the same representative values become greatly different from each other. To prevent the white balance adjustment results of images having similar color tones from becoming greatly different from each other, the second embodiment corrects the white balance adjustment coefficient.

Figure 8:
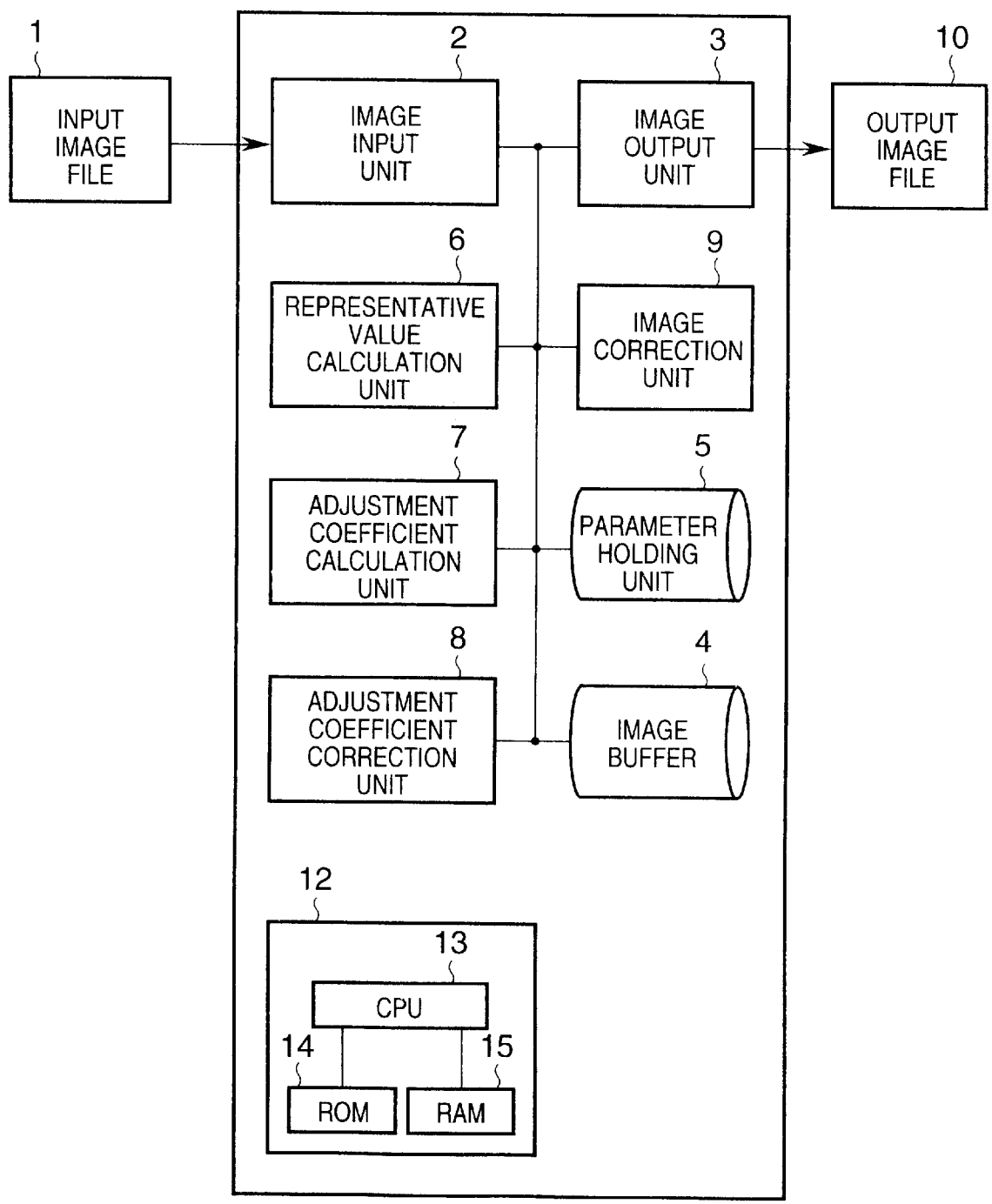
FIG. 8 is a block diagram showing an arrangement for performing white balance adjustment in the second embodiment.

FIG. 8 is a block diagram showing an arrangement for performing white balance adjustment in the second embodiment. In FIG. 8, the second embodiment further adopts an adjustment coefficient calculation unit 7 and adjustment coefficient correction unit 8. The remaining arrangement is the same as the first embodiment shown in FIG. 1, the same reference numerals denote the same parts, and a description thereof will be omitted.

The adjustment coefficient calculation unit 7 corresponds to the adjustment coefficient calculation unit 11 shown in FIG. 1, but uses a different adjustment coefficient calculation method. The adjustment coefficient correction unit 8 calculates a final adjustment coefficient using table data for limiting the adjustment value, and stores the adjustment coefficient in the parameter holding unit 5.

Figure 9:
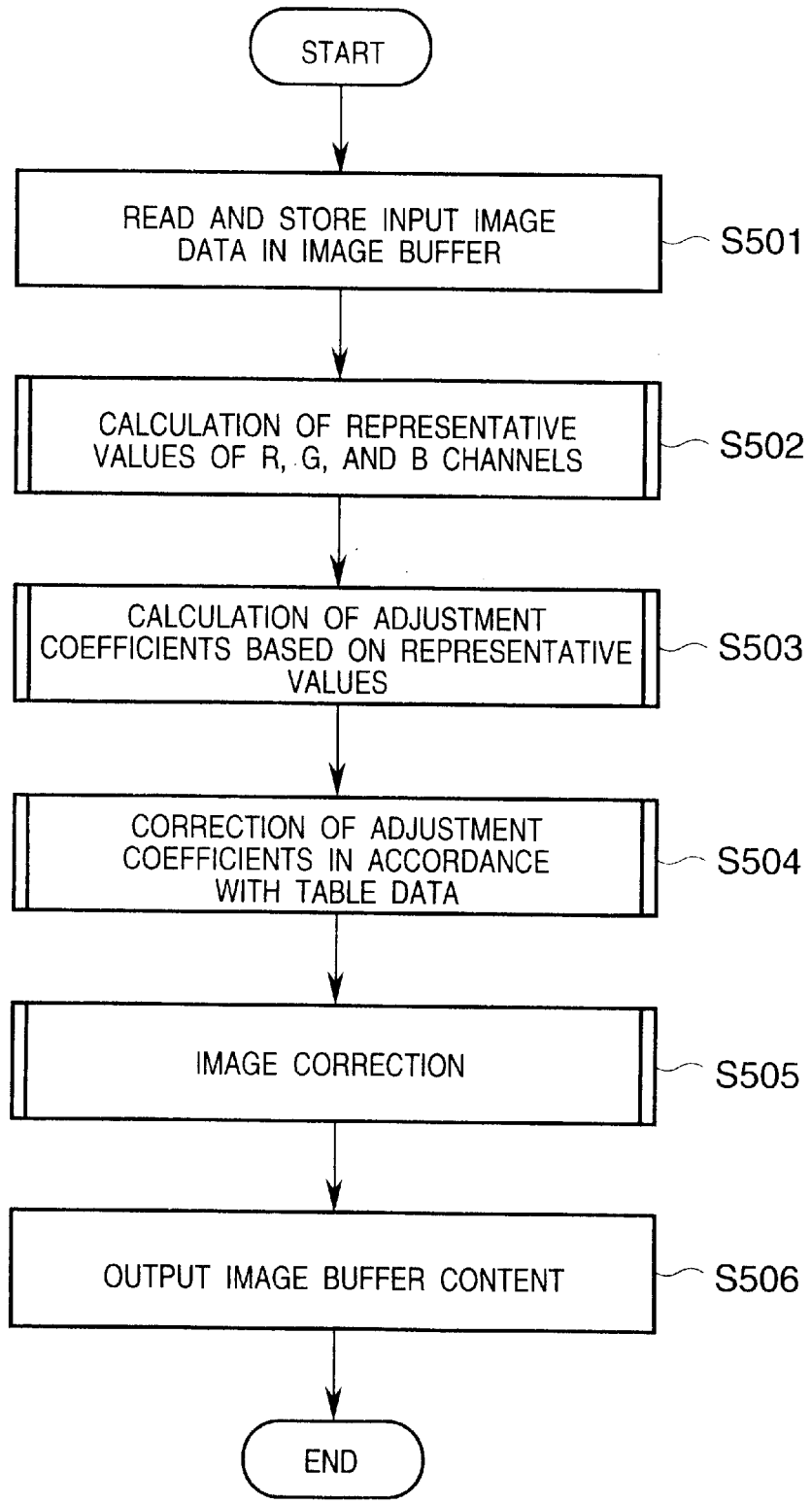
FIG. 9 is a flow chart showing white balance adjustment processing in the second embodiment.

FIG. 9 is a flow chart showing white balance adjustment processing according to the second embodiment in the arrangement shown in FIG. 8. The processing of the flow chart is realized when a CPU 13 executes a control program stored in a ROM 14.

In FIG. 9, steps S501 and S502, and steps S505 and S506 are the same as steps S101 and S102, and steps S104 and S105 shown in FIG. 2 in the first embodiment, and a description thereof will be omitted.

In step S503, the adjustment coefficient calculation unit 7 calculates adjustment coefficients for R, G, and B channels on the basis of representative values calculated in step S502. In step S504, the adjustment coefficient correction unit 8 corrects the adjustment coefficients calculated in step S503 to optimal values on the basis of table data.

Figure 10:
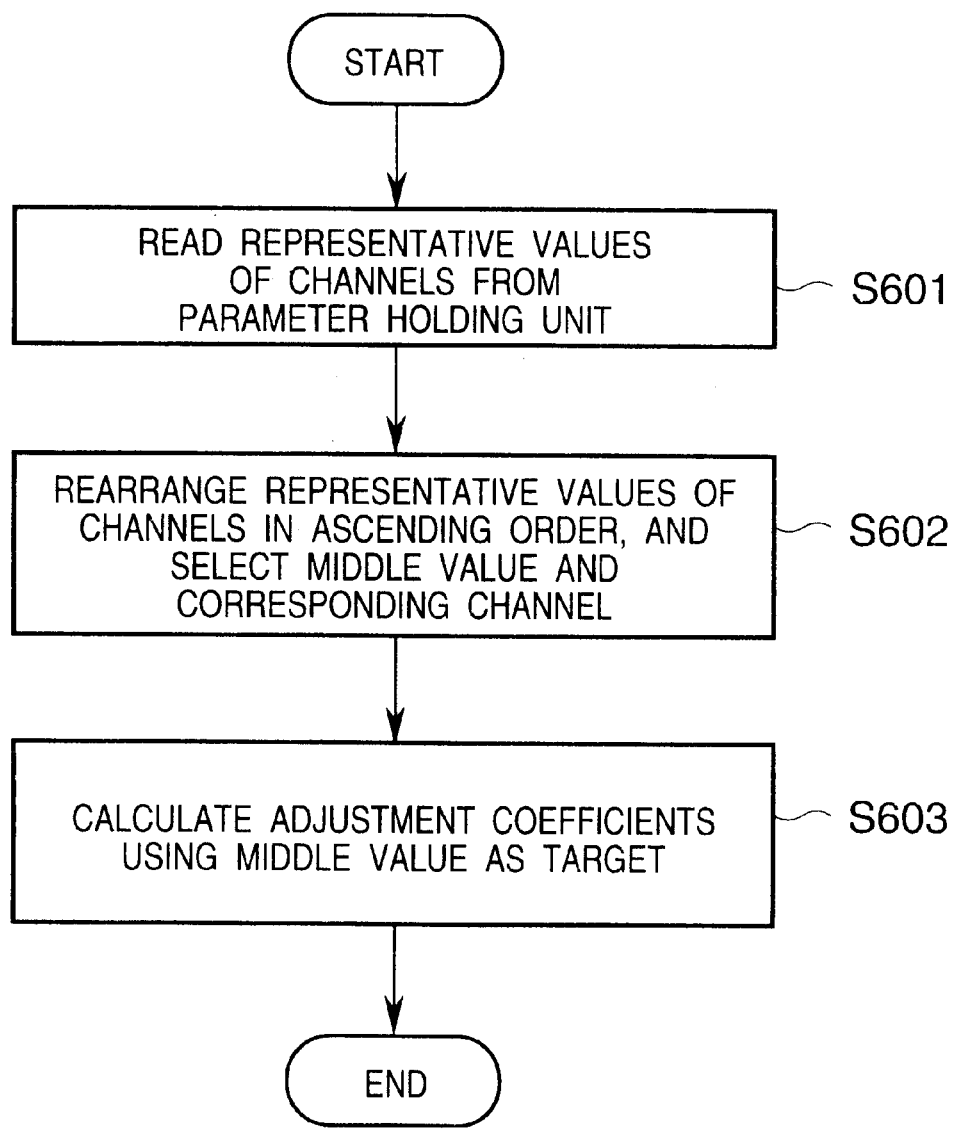
FIG. 10 is a flow chart showing adjustment coefficient calculation processing in the second embodiment.

FIG. 10 is a flow chart showing detailed adjustment coefficient calculation processing in step S503. This processing is executed by the adjustment coefficient calculation unit 7.

In step S601, the adjustment coefficient calculation unit 7 reads out the representative values of the channels from a parameter holding unit 5. In step S602, the adjustment coefficient calculation unit 7 rearranges the representative values in an ascending order, and selects a center channel and its middle value similarly to the first embodiment. In step S603 as in the first embodiment, the adjustment coefficient calculation unit 7 calculates adjustment coefficients for the channels using the middle value as a target, and stores the calculated adjustment coefficients in the parameter holding unit 5. For example, when the adjustment coefficient is a γ value in 256-level gradation, the adjustment coefficient calculation unit 7 calculates γ using the above equation (1) and sets it as the adjustment coefficient.

Figure 11:
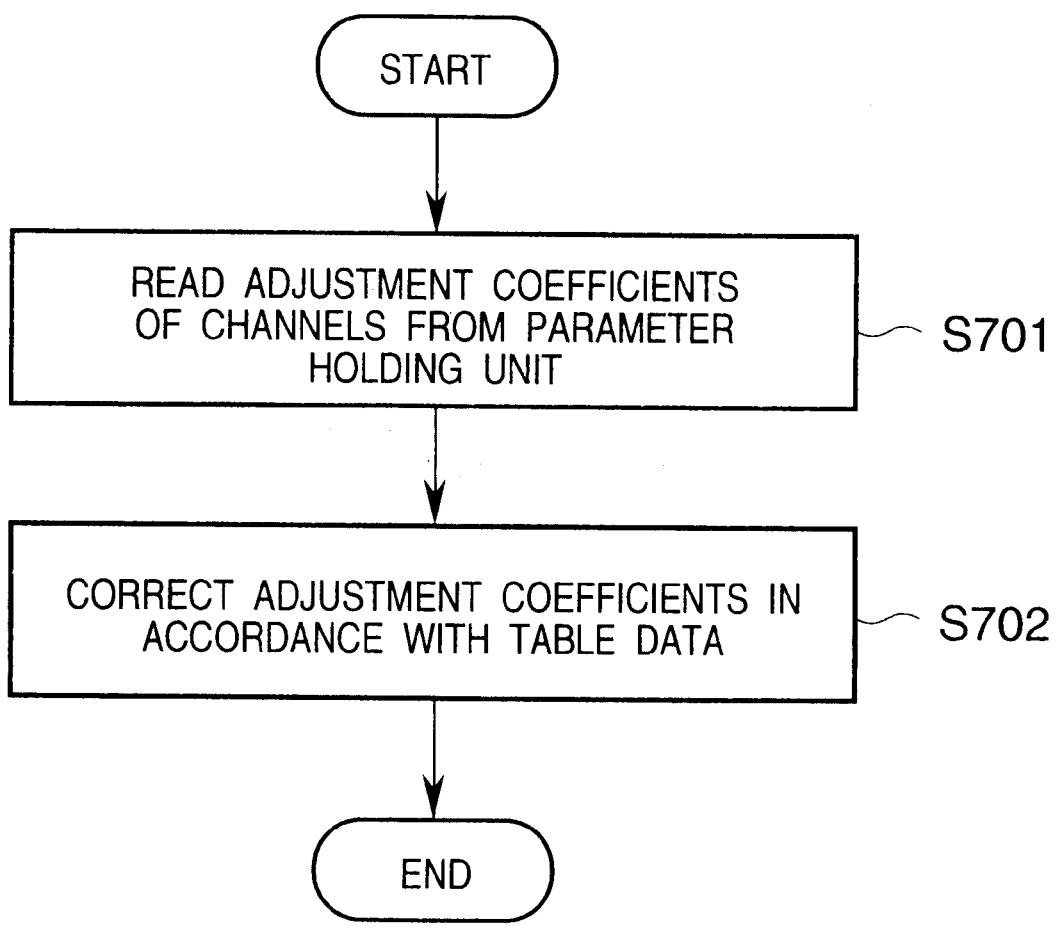
FIG. 11 is a flow chart showing adjustment coefficient correction processing in the second embodiment.

FIG. 11 is a flow chart showing detailed adjustment coefficient correction processing in step S504. This processing is executed by the adjustment coefficient correction unit 8.

In step S701, the adjustment coefficient correction unit 8 reads out the adjustment coefficients of the channels held in the parameter holding unit 5. In step S702, the adjustment coefficient correction unit 8 corrects the adjustment coefficients using table data created in advance. For example, when the adjustment coefficient is a γ value, the adjustment coefficient correction unit 8 creates table data like the one shown in FIG. 12, and converts the γ value based on this table, i.e., corrects the adjustment coefficient.

Figure 12:
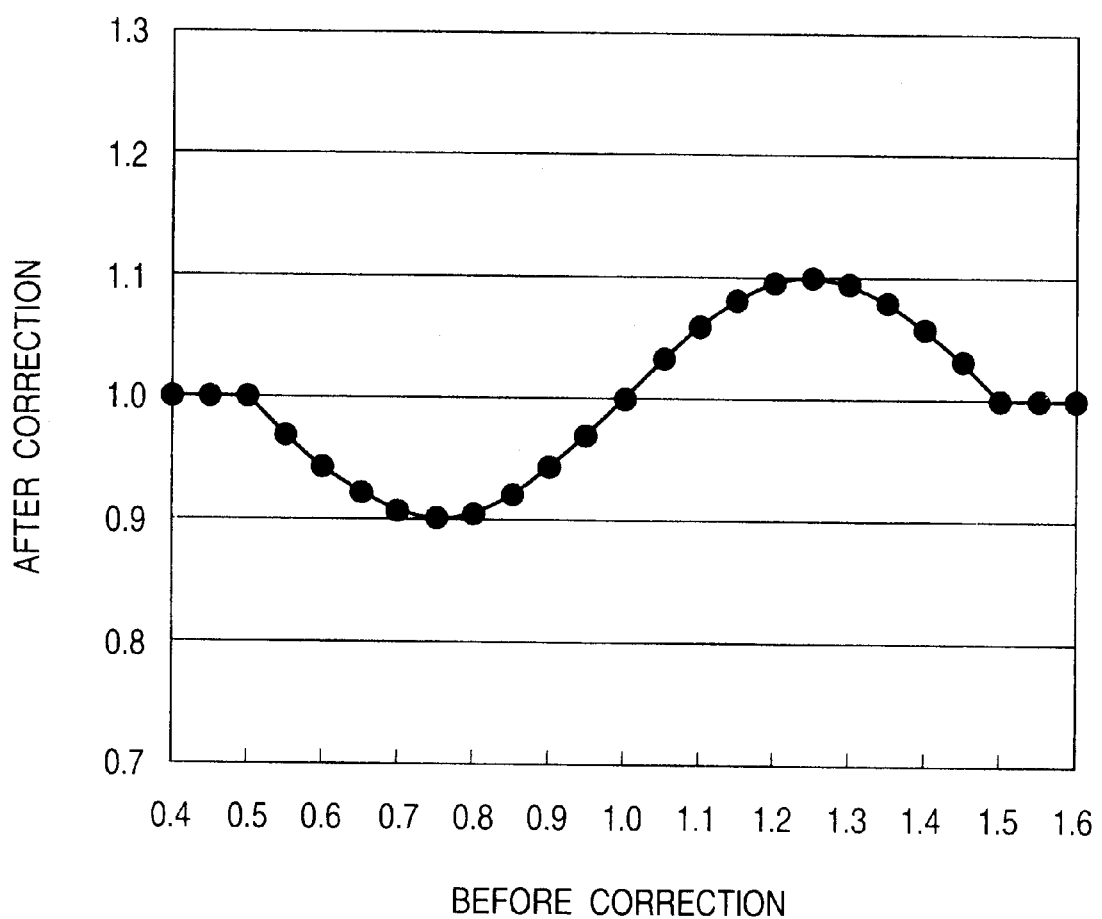
FIG. 12 is a graph showing an example of a table which is looked up in adjustment coefficient correction processing in the second embodiment.

In the table data shown in FIG. 12, the γ value ranging from 0.4 to 1.6 before correction is limited to 0.9 to 1.1 after correction. The adjustment coefficient correction unit 8 determines that a channel exhibits a large γ value due to not color fog but the trend of the scene. Thus, the adjustment coefficient correction unit 8 weakens the γ value, i.e., adjustment coefficient at the boundary of a given yield point.

Note that the table shown in FIG. 12 is prepared in advance in a proper internal ROM of the adjustment coefficient correction unit 8 or in the internal ROM 14 of a controller 12. Alternatively, the table may be prepared in an internal RAM 15 of the controller 12 so as to appropriately change the table.

The table data can be arbitrarily set by a user via a predetermined user interface. Instead, the correction degree may be automatically determined in accordance with the ratio to the middle value serving as a target, like the γ value.

As described above, according to the second embodiment, white balance adjustment is done based on arbitrary continuous table data without determining a scene by a predetermined threshold. For example, for a normal scene, standard white balance adjustment is performed. For an entirely reddish image scene such as a sunset scene, the adjustment coefficient (γ value) of the R channel is suppressed to properly leave the R component. In this way, white balance adjustment can be arbitrarily controlled.

Since the table data is set to consecutive values, the white balance adjustment coefficient can be continuously corrected while preventing the processing results of images having similar color tones from becoming greatly different from each other. That is, white balance adjustment with good color balance can be realized while preventing the adjustment results of images having similar color tones from becoming greatly different from each other.

Note that the second embodiment corrects the adjustment coefficient using the table. However, the means for correcting the adjustment coefficient is not limited to the table. Any means such as a function or a plurality of thresholds can be employed as long as a predetermined limitation can be defined for image correction based on the adjustment coefficient.

<Modification of Second Embodiment>

In general, image data photographed by an image sensing device such as a camera exhibits various characteristics under photographing illumination conditions. In some case, a user intentionally sets illumination conditions in order to produce a photographed image with an additional effect. When this photographed image data is subjected to white balance correction, the characteristics must be left in consideration of the illumination conditions.

The image processing apparatus of the second embodiment adjusts white balance using table data. Thus, by preparing and selectively using a plurality of table data corresponding to illumination conditions, i.e., a plurality of color temperatures, white balance adjustment can be done while leaving image characteristics intended by the user.

According to the second embodiment, optimal white balance adjustment can be selected with a change in color temperature.

Note that the first and second embodiments calculate the adjustment coefficient calculated based on a middle value among the representative values of the color components. However, the present invention is not limited to these embodiments, and can calculate the adjustment coefficient based on the average value of the representative values of the color components or the representative value of a specific component (e.g., G component).

The adjustment coefficients can also be calculated using the white and dark points of an image as the representative values of the color components. The white and dark points are respectively defined as, e.g., the averages of upper and lower 5% data of the histograms of the R, G, and B channels. Lookup tables for the R, G, and B channels are created such that the white and dark points of the R, G, and B channels obtained by this method are converted into predetermined values. As a result, a tinged highlight portion can be removed to realize good color balance.

<Third Embodiment>

The third embodiment according to the present invention will be described below. The third embodiment applies white balance adjustment described in the second embodiment to an image processing apparatus which can be connected to a plurality of input devices.

Figure 13:
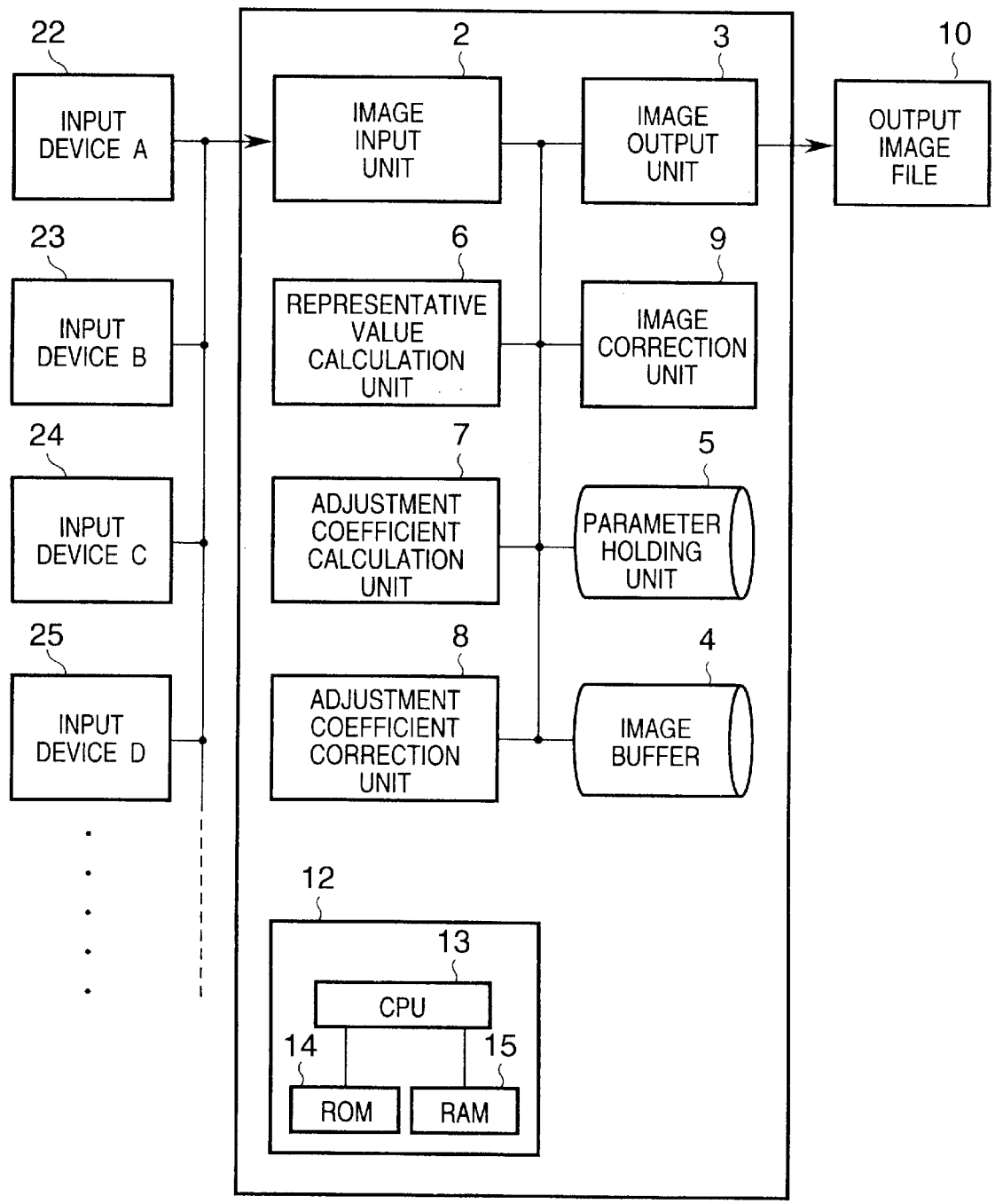
FIG. 13 is a block diagram showing an arrangement for performing white balance adjustment in the third embodiment.

FIG. 13 is a block diagram showing an arrangement for performing white balance adjustment in the third embodiment. In FIG. 13, a plurality of input devices A to D (22 to 25) can be connected to an image input unit 2. The remaining arrangement is the same as the second embodiment shown in FIG. 8, the same reference numerals denote the same parts, and a description thereof will be omitted.

The input devices A to D (22 to 25) are devices such as a scanner and digital camera having different output image data characteristics. The image input unit 2 reads image signals input from the input devices A to D, and writes them in an image buffer 4.

In the second embodiment, one type of table data for correcting the white balance adjustment coefficient is prepared. In the third embodiment, a plurality of tables are prepared for respective input image data characteristics. For example, tables are prepared for the input devices A to D in advance in accordance with their input characteristics. An adjustment coefficient correction unit 8 selectively uses these tables in accordance with image data to be corrected, thereby easily realizing optimal white balance adjustment for the input devices A to D.

A method of specifying the input device in the third embodiment will be explained. FIG. 14 is a view showing an example of the format of an input image signal in the third embodiment. The format includes image information such as input device information, in addition to image data itself. The adjustment coefficient correction unit 8 can specify an input device based on image information accessory to the image data.

In this manner, the adjustment coefficient can be optimally corrected in accordance with input device characteristics, thereby realizing optimal white balance adjustment corresponding to the input device. That is, the third embodiment can realize appropriate white balance adjustment corresponding to the white balance adjustment function of the input device.

Adjustment coefficient calculation processing can also be controlled in accordance with input device characteristics. For example, in the second embodiment, the representative values (e.g., average values) of the R, G, and B channels are calculated based on the image histogram to obtain the adjustment coefficients (e.g., γ values). Any method can be properly selected in accordance with input device characteristics from the first method of calculating the adjustment coefficients on the basis of average values based on the histogram, and white and black points, the second method of calculating the adjustment coefficients on the basis of only average values, the third method of calculating the adjustment coefficients on the basis of only white and black points, and the fourth method of not calculating any adjustment coefficients, i.e., not executing any white balance adjustment.

For example, when the device name of a digital camera is indicated as an "input device name" in image information accessory to image data, as shown in FIG. 14, the adjustment coefficient calculation unit calculates the adjustment coefficients (e.g., γ values) and creates lookup tables based on any one of the first to fourth methods in accordance with the device name.

In the first method of calculating the adjustment coefficients, the white and black points must be calculated based on the histogram, and white point & black point calculation processing can be adjusted in accordance with the device name. More specifically, the ratio (percentage) of the white and black regions to the whole histogram can be changed in accordance with the device name.

The first method (calculation of the adjustment coefficients based on white and black points and average values) can appropriately adjust white balance to remove a tinged image highlight portion, and can also properly adjust white balance at the halftone portion. The first method is particularly effective when the input device does not have any high-performance white balance function.

The second method (calculation of the adjustment coefficients based on average values) is effective for an image in which a tinged highlight portion is removed but white balance is poor at the halftone portion.

The third method (calculation of the adjustment coefficients based on white and black points) is effective for an image in which white balance is poor at highlight and dark portions.

The fourth method (no calculation of the adjustment coefficients) is effective when the input device has a high-performance white balance function.

As described above, according to the third embodiment, optimal adjustment coefficients corresponding to input device characteristics can be obtained to realize optimal white balance adjustment corresponding to the input device.

Note that the third embodiment switches the adjustment coefficient correction table or adjustment coefficient calculation method in accordance with input device characteristics. Instead, execution/nonexecution of white balance adjustment itself can be controlled.

In addition, the third embodiment specifies an input device based on image information included in an input image signal. Instead, it is also possible to separate input device information from image data itself, and to adopt a device information acquisition means of acquiring only the input device information.

Furthermore, a user can explicitly specify input device information. For example, device information designated by the user can be added to an input image signal or transmitted to the device information acquisition means.

<Fourth Embodiment>

The fourth embodiment according to the present invention will be explained. In the fourth embodiment, white balance adjustment corresponding to input device characteristics described in the third embodiment is further expanded and applied to a plurality of image correction processes.

Figure 15:
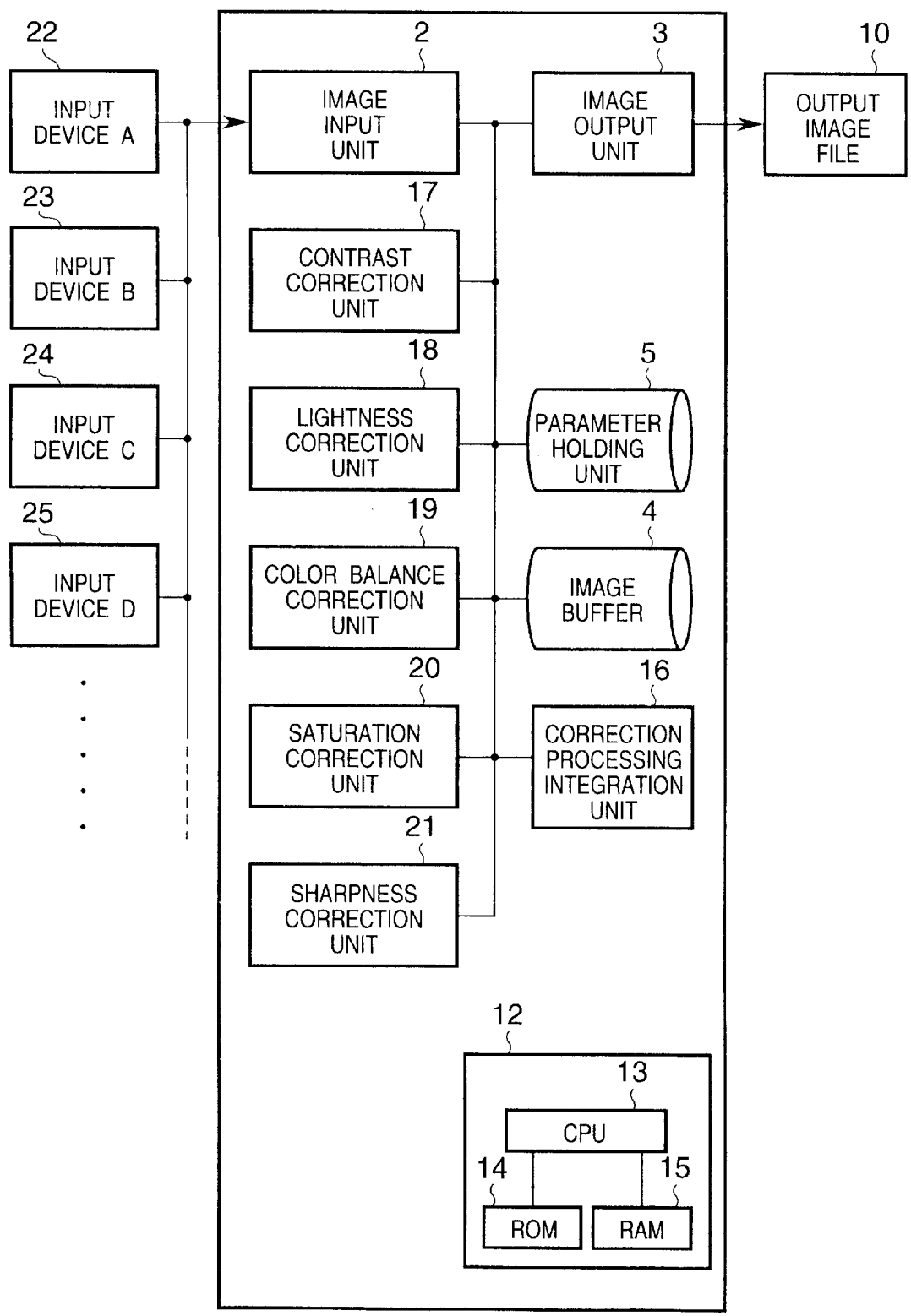
FIG. 15 is a block diagram showing an arrangement for performing image correction processing in the fourth embodiment.

FIG. 15 is a block diagram showing an arrangement for performing image correction processing in the fourth embodiment. In FIG. 15, the white balance adjustment arrangement described in the third embodiment is replaced with a plurality of correction units: contrast correction unit 17, lightness correction unit 18, color balance correction unit 19, saturation correction unit 20, and sharpness correction unit 21. A correction processing integration unit 16 appropriately controls the use of these correction units on the basis of the contents of a parameter holding unit 5, thereby properly correcting an image signal in accordance with the input device.

The remaining arrangement is the same as the third embodiment shown in FIG. 13, the same reference numerals denote the same parts, and a description thereof will be omitted.

The contrast correction unit 17 corrects the contrast of an input image, the lightness correction unit 18 corrects the lightness of the input image, the color balance correction unit 19 corrects the color balance of the input image, the saturation correction unit 20 corrects the saturation of the input image, and the sharpness correction unit 21 corrects the sharpness of the input image.

The fourth embodiment comprises the five correction processing units. Image correction processing using these units is controlled by the correction processing integration unit 16 on the basis of the contents of the parameter holding unit 5.

Figure 16:
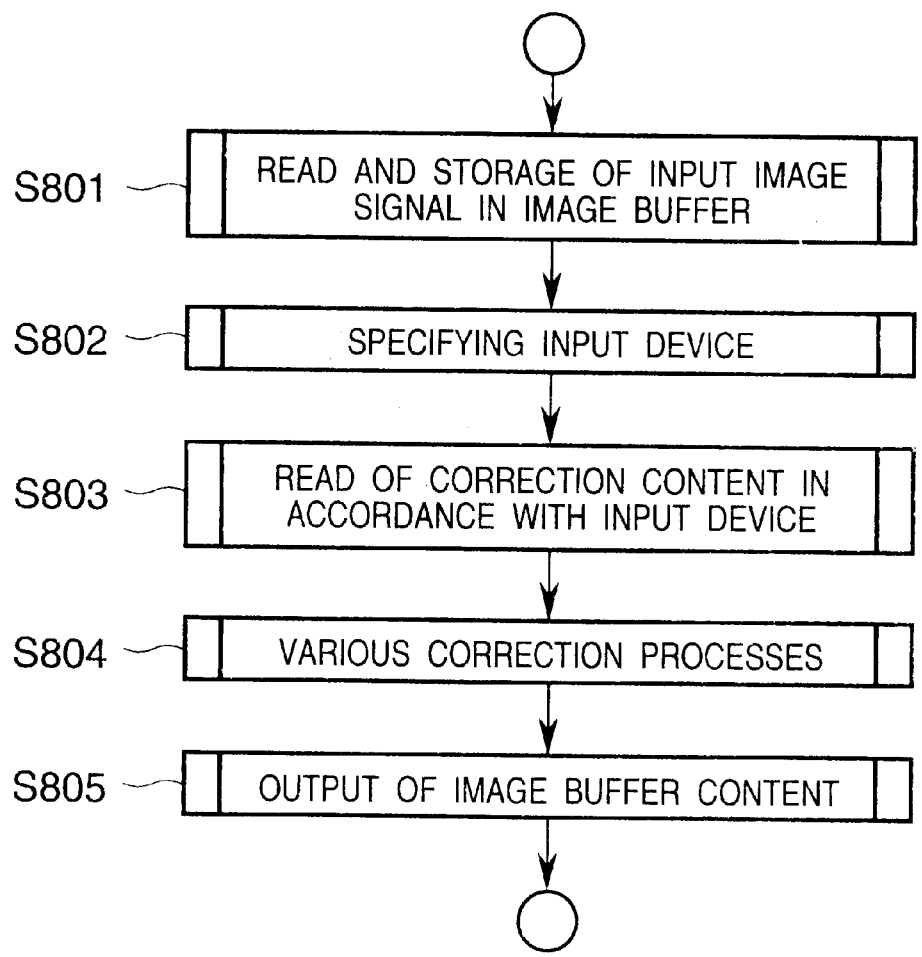
FIG. 16 is a flow chart showing image processing in the fourth embodiment.

FIG. 16 is a flow chart showing image correction processing in the fourth embodiment. In step S801, an image input unit 2 reads input image signals from the input devices A to D (22 to 25), and stores them in an image buffer 4. In step S802, the correction processing integration unit 16 specifies the input device of each image signal. In this case, the input device is specified by referring to device information included in the image signal, similar to the third embodiment.

In step S803, the correction processing integration unit 16 reads out from the parameter holding unit 5 combination information of correction processes corresponding to the specified input device. In step S804, the correction processing integration unit 16 sequentially executes the five correction processes for the image signal stored in the image buffer 4 on the basis of the combination information.

In step S805, an image output unit 3 writes the corrected image data stored in the image buffer 4 in an output image file 10, thereby obtaining the image having undergone various correction processes.

FIG. 17 shows an example of data held in the parameter holding unit 5. In the fourth embodiment, order parameters representing the order of correction processes are stored as combination information of correction processes, in addition to the correction degree parameters of respective input devices. More specifically, in each column of FIG. 17, the dotted left part indicates the order parameter, and the right part indicates the correction degree parameter. The order parameter of each correction process is set to "FALSE" when this correction process is not executed.

Note that each parameter held in the parameter holding unit 5 is in an initial state shown in, e.g., FIG. 17, and can be changed at a predetermined timing or based on a user instruction, as a matter of course.

Figure 18A:
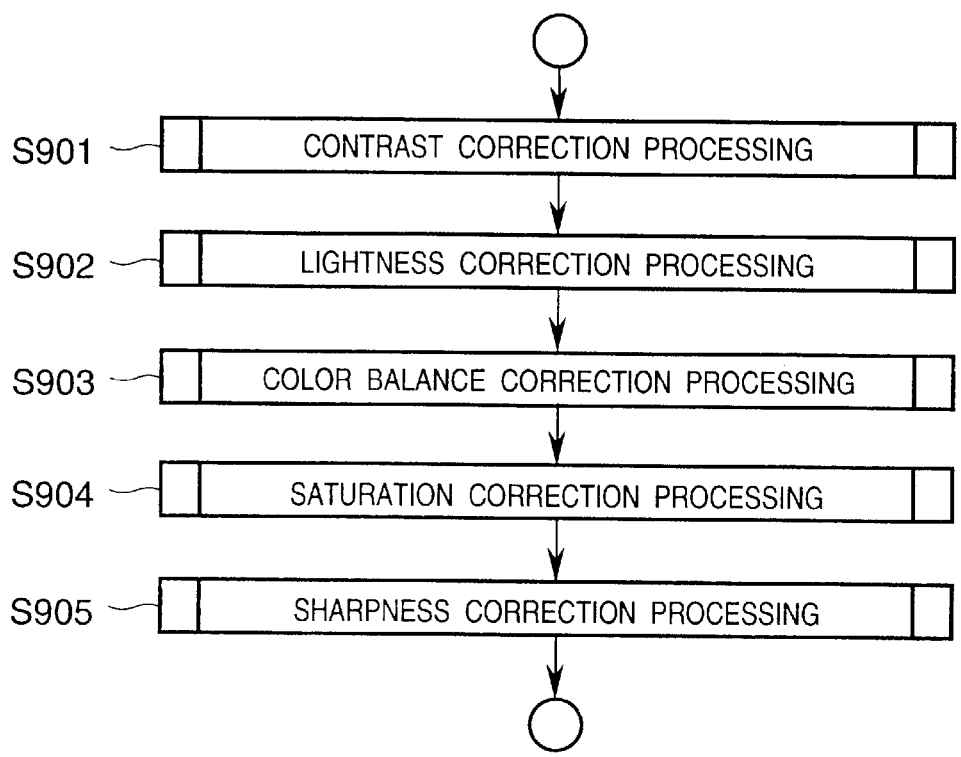
FIG. 18A is a flow chart showing correction processing for each input device in the fourth embodiment.
Figure 18B:
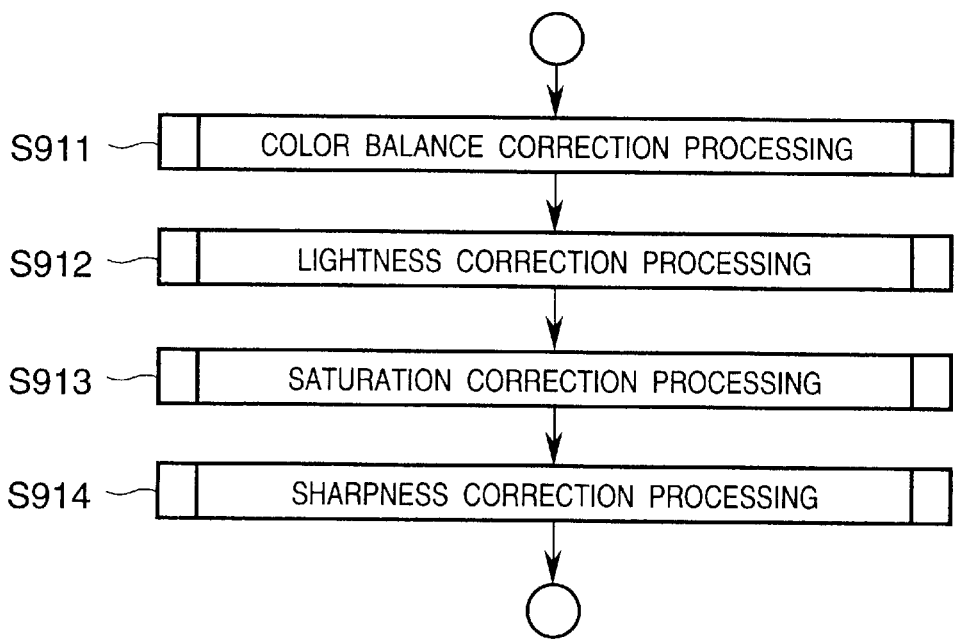
FIG. 18B is a flow chart showing another correction processing for each input device in the fourth embodiment.

Correction processing based on the parameters will be explained. FIGS. 18A and 18B are flow charts each showing an example of correction control processing in the correction processing integration unit 16. This processing corresponds to detailed processing in step S804 shown in FIG. 16.

FIG. 18A shows a correction processing procedure for an image signal input from the input device A. That is, the image signal undergoes the respective correction processes in accordance with their set correction degree parameters in the order of contrast correction (S901), lightness correction (S902), color balance correction (S903), saturation correction (S904), and sharpness correction (S905) based on the parameters shown in FIG. 17.

FIG. 18B shows a correction processing procedure for an image signal input from the input device B. That is, the image signal is corrected in the order of color balance correction (S911), lightness correction (S912), saturation correction (S913), and sharpness correction (S914) based on the parameters shown in FIG. 17. In this example, contrast correction is not executed because the order parameter is set to "FALSE".

As described above, the fourth embodiment can perform a plurality of correction processes for an input image in the optimal order with optimal degrees in accordance with the characteristics of a connectable input device. As a result, an output image can be obtained with optimal image quality. Unnecessary correction processing can be skipped to shorten the processing time.

In the fourth embodiment, the number of correction processing units controlled by the correction processing integration unit 16 is not limited to the example shown in FIG. 15. For example, the fourth embodiment can be changed to or equipped with an arrangement of performing another correction processing such as color misregistration correction.

In general, even image signals input from the same image input device result in different image qualities depending on device settings. For example, when the image input device is a scanner, the sharpness of an obtained image changes under different read resolution settings. When the image input device is a digital camera, the color balance of an obtained image changes under different white balance settings.

For this reason, in the third and fourth embodiments, tables and parameters are set for respective input devices. However, for a specific input device, tables and parameters are preferably prepared for detailed settings. This can optimize the correction processing for each setting in the specific input device.

The connectable image input device includes not only a scanner and digital camera, but also various devices such as a device for inputting image data read out from a general-purpose storage medium, and a device for inputting image data transferred from another image processing apparatus via an interface.

[Other Embodiments]

The present invention may be applied to a system constituted by a plurality of devices (e.g., a host computer, interface device, reader, and printer) or an apparatus comprising a single device (e.g., a copying machine or facsimile apparatus).

The object of the present invention is realized even by supplying a storage medium storing software program codes for realizing the functions of the above-described embodiments to a system or apparatus, and causing the computer (or a CPU or MPU) of the system or apparatus to read out and execute the program codes stored in the storage medium. In this case, the program codes read out from the storage medium realize the functions of the above-described embodiments by themselves, and the storage medium storing the program codes constitutes the present invention. As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in a function expansion card inserted into the computer or the memory of a function expansion unit connected to the computer, and the CPU of the function expansion card or function expansion unit performs part or all of actual processing on the basis of the instructions of the program codes.

When the present invention is applied to the storage medium, the storage medium stores program codes corresponding to the above flow charts (FIGS. 2, 3, 5, 6, 9, 10, 11, 15, 16, 18A and 18B).

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus capable of performing correction processing by a plurality of types of correction methods for image data, comprising:

an image input unit arranged to input image data from an input device;

a specifying unit arranged to specify characteristics of the input device;

a correction control unit arranged to control a plurality of types of correction processes for the image data on the basis of the characteristics of the input device, and a holding unit arranged to hold combination information about the plurality of types of correction processes for the characteristics of each input unit, wherein said correction control unit controls the plurality of types of correction processes for the image data on the basis of the combination information held in said holding unit, wherein said correction control unit determines a correction process to be executed on the basis of the combination information, wherein the combination information includes process order information of correction processes within a combination, and wherein said correction control unit controls an order of the plurality of types of correction processes for the image data on the basis of the process order information.

2. The apparatus according to claim 1, wherein said holding unit further holds correction contents in the plurality of types of correction methods for the characteristics of each input device.

3. The apparatus according to claim 1, wherein the characteristics of the input device depend on the type of input device.

4. The apparatus according to claim 1, wherein the characteristics of the input device depend on a setting content of input device.

5. The apparatus according to claim 1, wherein the image data includes characteristic information representing the characteristics of the input device, and said specifying unit specifies the characteristics of the input device on the basis of the characteristic information.

6. The apparatus according to claim 5, wherein the characteristic information is added to the image data on the basis of a user instruction.

7. The apparatus according to claim 1, wherein the plurality of types of correction methods include contrast correction.

8. The apparatus according to claim 1, wherein the plurality of types of correction methods include lightness correction.

9. The apparatus according to claim 1, wherein the plurality of types of correction methods include color balance correction.

10. The apparatus according to claim 1, wherein the plurality of types of correction methods include saturation correction.

11. The apparatus according to claim 1, wherein the plurality of types of correction methods include sharpness correction.

12. The apparatus according to claim 1, wherein the plurality of types of correction methods include color misregistration correction.

13. The apparatus according to claim 1, wherein the image input device includes a digital camera.

14. The apparatus according to claim 1, wherein the image input device includes a scanner.

15. The apparatus according to claim 1, wherein the image input device includes a device for inputting image data stored in a storage medium.

16. An image processing method in an image processing apparatus capable of performing correction processing by a plurality of types of correction methods for image data, comprising:

an input step of inputting image data from an input device;

a specifying step of specifying characteristics of the input device; and a correction control step of controlling a plurality of types of correction processes for the image data on the basis of the characteristics of the input device; and a holding step of holding combination information about the plurality of types of correction processes for the characteristics of each input device, wherein said correction control step controls the plurality of types of correction processes for the image data on the basis of the combination information held in said holding step, wherein said correction control step determines a correction process to be executed on the basis of the combination information, wherein the combination information includes process order information of correction processes within a combination, wherein said correction control step controls an order of the plurality of types of correction processes for the image data on the basis of the process order information.

17. A recording medium comprising program codes of an image processing method in an image processing apparatus capable of performing correction processing by a plurality of types of correction methods for image data, comprising:

a code of an input step of inputting image data from an input device;

a code of a specifying step of specifying characteristics of the input device; and a code of a correction control step of controlling a plurality of types of correction processes for the image data on the basis of the characteristics of the input device; and a code of a holding step of holding combination information about the plurality of types of correction processes for the characteristics of each input device, wherein said code of said correction control step controls the plurality of types of correction processes for the image data on the basis of the combination information held in said code of said holding step, wherein said code of said correction control step determines a correction process to be executed on the basis of the combination information, wherein the combination information includes process order information of correction processes within a combination, wherein said code of said correction control step controls an order of the plurality of types of correction processes for the image data on the basis of the process order information.

* * * * *